(12) United States Patent
Xu et al.

(10) Patent No.: US 12,110,858 B1
(45) Date of Patent: Oct. 8, 2024

(54) MARINE CURRENT ENERGY GENERATING DEVICE FOR DEEP SEA CAGE

(71) Applicant: GUANGDONG OCEAN UNIVERSITY, Zhanjiang (CN)

(72) Inventors: Qing Xu, Zhanjiang (CN); Haowei Li, Zhanjiang (CN); Yingpeng Cai, Zhanjiang (CN); Weibin Xu, Zhanjiang (CN); Xiaojia Fang, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 18/609,250

(22) Filed: Mar. 19, 2024

Related U.S. Application Data

(63) Continuation of application No. PCT/CN2023/139833, filed on Dec. 19, 2023.

(30) Foreign Application Priority Data

Apr. 28, 2023 (CN) .......................... 202310477167.6

(51) Int. Cl.
  *F03B 17/06* (2006.01)
  *H02N 1/04* (2006.01)

(52) U.S. Cl.
  CPC ............... *F03B 17/06* (2013.01); *H02N 1/04* (2013.01); *F05B 2220/706* (2013.01);
  (Continued)

(58) Field of Classification Search
  CPC ..... F03B 17/06; H02N 1/04; F05B 2220/706; F05B 2260/30; F05B 2260/95; F05B 2280/1071; F05B 2280/6011
  (Continued)

(56) References Cited

U.S. PATENT DOCUMENTS

| 11,319,920 B2* | 5/2022 | Blodgett ............... H02K 7/1823 |
| 2011/0084493 A1* | 4/2011 | Kaplan ................... F03B 17/06 |
| | | 290/55 |

(Continued)

FOREIGN PATENT DOCUMENTS

| CN | 107294343 A | 10/2017 |
| CN | 108331702 A | 7/2018 |

(Continued)

OTHER PUBLICATIONS

CN 115405459 A; Ying Gong et al. ; Generating Device and Generating System Based on Vortex-induced Swing. (Year: 2022).*
(Continued)

*Primary Examiner* — Ahmed Elnakib
(74) *Attorney, Agent, or Firm* — Hemisphere Law, PLLC; Zhigang Ma

(57) ABSTRACT

Provided is a marine current energy generating device for a deep sea cage. The marine current energy generating device includes a vortex vibration generating portion, where the vortex vibration generating portion is used for generating vortex vibration on a side facing away from a marine current; power generating portions, where several nano friction generators are arranged in the power generating portions, and the several nano friction generators generate power by using the vortex vibration generated by the vortex vibration generating portion and are electrically connected to each other; a guide portion, where the guide portion is used for making the vortex vibration generating portion perpendicular to a direction of the marine current all the time; and corrosion protection assemblies, where the corrosion protection assemblies are arranged at joints of the vortex vibration generating portion to the power generating portions and the guide portion.

4 Claims, 5 Drawing Sheets

(52) U.S. Cl.
CPC ....... *F05B 2260/30* (2013.01); *F05B 2260/95* (2013.01); *F05B 2280/1071* (2013.01); *F05B 2280/6011* (2013.01)

(58) Field of Classification Search
USPC .................................. 310/309, 310; 290/53
See application file for complete search history.

(56) References Cited

U.S. PATENT DOCUMENTS

| | | | | |
|---|---|---|---|---|
| 2020/0070664 | A1* | 3/2020 | In | F03D 3/002 |
| 2023/0064609 | A1* | 3/2023 | Zhang | H02N 1/04 |

FOREIGN PATENT DOCUMENTS

| | | |
|---|---|---|
| CN | 113067495 A | 7/2021 |
| CN | 113818984 A | 12/2021 |
| CN | 113864102 A | 12/2021 |
| CN | 114223594 A | 3/2022 |
| CN | 114755448 A | 7/2022 |
| CN | 115459622 A | 12/2022 |
| CN | 116517756 A | 8/2023 |
| KR | 101850959 B1 | 4/2018 |
| WO | 2022110859 A1 | 6/2022 |

OTHER PUBLICATIONS

CNIPA, Notification of a First Office Action for CN202310477167.6, Sep. 21, 2023.
Guangdong Ocean University (Applicant), Reply to Notification of a First Office Action for CN202310477167.6, w/ (allowed) replacement claims, Oct. 25, 2023.
CNIPA, Notification to grant patent right for invention in CN202310477167.6, Jan. 2, 2024.

* cited by examiner

MARINE CURRENT ENERGY GENERATING DEVICE FOR DEEP SEA CAGE

TECHNICAL FIELD

The present disclosure belongs to the technical field of underwater power generation, and in particular to a marine current energy generating device for a deep sea cage.

BACKGROUND

Deep sea cage culture is one of the rapidly developing culture methods in recent years. Nowadays, people are committed to creating an intelligent and highly automated deep sea cage culture system, real-time monitoring various parameters of the deep-sea cage, obtaining a working status of an apparatus, and real-time monitoring the temperature of a culture environment of the deep sea cage, an oxygen content and so on, so as to achieve intelligent putting and feeding. Efficient culture is obtained through intelligent means.

However, the increase in intelligence and automation has increased the demand for electricity, and in the deep sea, power supply is an issue that has been difficult to solve. In the deep sea, marine current energy resources are abundant but have not been effectively utilized. Some deep-sea power generation technologies utilize the Karman vortex street effect, which provides kinetic energy through vortex vibration to drive an engine to generate power. However, the existing Karmen vortex street power generation technology is less efficient, the power generation efficiency is greatly affected by the speed of the marine current, and the related device is not expandable, that is to say, the power generation only depends on the speed of the marine current, and fails to make full use of the marine current energy. Moreover, the general power generation devices and materials need to be replaced after a short period of time since seawater is highly corrosive, otherwise the power generation performance of the devices will be affected. So far the efficient use of the marine current energy is still in the development stage, and there is no stable technical means to reduce the corrosion of seawater. Therefore, there is an urgent need for a marine current energy generating device for a deep-sea cage based on the Karman vortex street principle, which fully and efficiently utilizes marine current energy for power generation, can also change the power generation capacity according to demands, and can work for a long time in seawater.

SUMMARY

An objective of the present disclosure is to provide a marine current energy generating device for a deep sea cage, so as to solve the above problems and achieve the objective of using a Karman vortex street principle to fully and efficiently utilize marine current energy for power generation, also change the power generation capacity according to demands, and work for a long time in seawater.

In order to achieve the above objective, the present disclosure provides a following technical solution. A marine current energy generating device for a deep sea cage includes:

a vortex vibration generating portion, where the vortex vibration generating portion is used for generating vortex vibration on a side facing away from a marine current;

power generating portions, where the several power generating portions are arranged in parallel on a side wall of the vortex vibration generating portion facing away from the marine current, several nano friction generators are arranged in the power generating portions, the several nano friction generators generate power by using the vortex vibration generated by the vortex vibration generating portion, and the several nano friction generators are electrically connected to each other;

a guide portion, where the vortex vibration generating portion is rotatably connected to a cage through the guide portion, and the guide portion is used for making the vortex vibration generating portion perpendicular to a direction of a marine current speed all the time; and corrosion protection assemblies, where the corrosion protection assemblies are arranged at joints of the vortex vibration generating portion to the power generating portions, at a joint of the vortex vibration generating portion to the guide portion, and between the power generating portions and the nano friction generators separately.

Optionally, the vortex vibration generating portion includes a cross rod, the cross rod has a trapezoidal cross section, the power generating portions are fixedly connected to a side wall of the cross rod facing away from the marine current, and a middle of a top surface of the cross rod is fixedly connected to the guide portion.

Optionally, the power generating portion includes several fixing frames, the several fixing frames are fixedly connected to a side wall of the cross rod facing away from the marine current, the several fixing frames are parallel to a direction of the marine current, and the fixing frames are flexibly connected to the several nano friction generators through several connecting assemblies respectively.

Optionally, the connecting assembly includes several nylon ropes fixedly connected in the fixing frames in sequence from front to back along a flow direction of the marine current, the several nylon ropes are arranged in parallel with the cross rod separately, and sides of the nano friction generators are fixedly connected to the nylon ropes.

Optionally, surface areas of the nano friction generators in the fixing frames increase from front to back along a flow direction of the marine current.

Optionally, the guide portion includes a connecting rod arranged vertically, a bottom of the connecting rod is fixedly connected to the middle of the top surface of the cross rod, a top of the connecting rod is rotatably connected to the cage, a guide plate is fixedly connected to a side wall of the connecting rod, a side surface of the guide plate is parallel to an axis of the connecting rod and perpendicular to an axis of the cross rod, and the guide plate is used for driving the cross rod to rotate under push of the marine current, so as to make the cross rod perpendicular to the direction of the marine current speed all the time.

Optionally, the connecting rod, the cross rod and the fixing frames are made of stainless steel respectively.

Optionally, the corrosion protection assembly includes an anticorrosive coating and an corrosion protection coating material, and a joint of the connecting rod and the cross rod, joints of the cross rod and the fixing frames, joints of the fixing frames and the nylon ropes, and a joint of the connecting rod and the guide plate are smeared with the anticorrosive coating and coated with the corrosion protection coating material respectively.

Compared with the prior art, the present disclosure has the following advantages and technical effects. The vortex vibration generating portion mainly functions to generate a vortex street at a rear of the vortex vibration generating portion after a marine current passes through, and the generated vortex street can drive the several nano friction generators to rub and vibrate so as to generate electric energy. The power generating portion mainly functions to convert mechanical energy of vortex vibration generated by the vortex street into electric energy, so as to implement efficient power generation, and furthermore, the power generating portion can change the number and arrangement matrix of the nano friction generators connected according to actual use conditions, so as to fully use energy in space. The guide portion mainly functions to make the vortex vibration generating portion perpendicular to the flow direction of the marine current all the time by using push of the marine current when the flow direction of the marine current changes, and finally to make the nano friction generators fully use the mechanical energy of the vortex vibration to generate power. On the whole, the present disclosure solves the problems of low power generation efficiency and low energy utilization of marine current energy, and based on the Karman vortex street principle, the marine current energy can be fully and effectively used to generate power when a flow speed of the marine current is low. The connected number and arrangement mode of the nano friction generators can be changed according to actual conditions, such that the generation efficiency is effectively improved. Moreover, the nano friction generators can work in seawater for a long time through corrosion protection treatment.

BRIEF DESCRIPTION OF THE DRAWINGS

In order to explain the technical solutions in embodiments of the present disclosure or in the prior art more clearly, the accompanying drawings required in the embodiments are described below briefly. Apparently, the accompanying drawings in the following description show merely some embodiments of the present disclosure, and other drawings can be derived from these accompanying drawings by those of ordinary skill in the art without creative efforts.

In the figures, 1, connecting rod; 2, cross rod; 3, fixing frame; 4, guide plate; 5, cage; 6, nylon rope; 7, nano friction generator; 8, generator; 9, gear; 10, gear ring; 11, connecting block; 12, connecting groove; 13, groove; 14, metal stopper; 15, spring; 16, electromagnet; and 17, slide groove.

DETAILED DESCRIPTION OF THE EMBODIMENTS

The technical solutions of the embodiments of the present disclosure are clearly and completely described below with reference to the drawings. Apparently, the described embodiments are merely some embodiments rather than all embodiments of the present disclosure. Based on the embodiments of the present disclosure, all other embodiments acquired by those of ordinary skill in the art without making creative efforts fall within the scope of protection of the present disclosure.

To make the above objectives, features, and advantages of the present disclosure clearer and more comprehensible, the present disclosure is further described in detail below in conjunction with the accompanying drawings and the specific embodiments.

Embodiment 1

Figure 1:
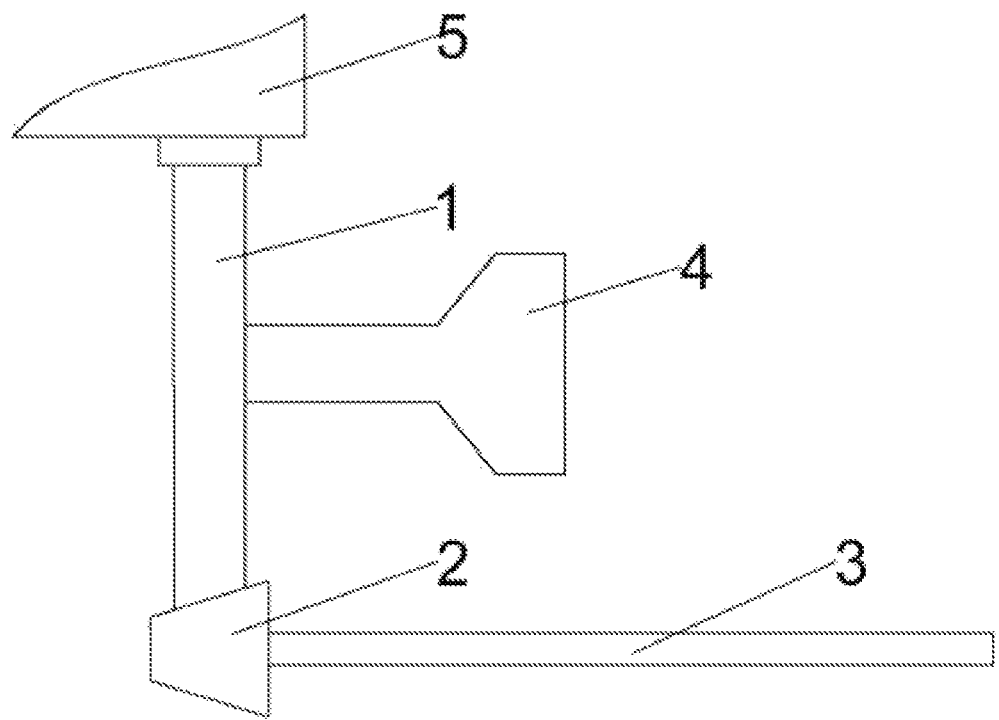
FIG. 1 is a front view of a generation device according to the present disclosure.
Figure 2:
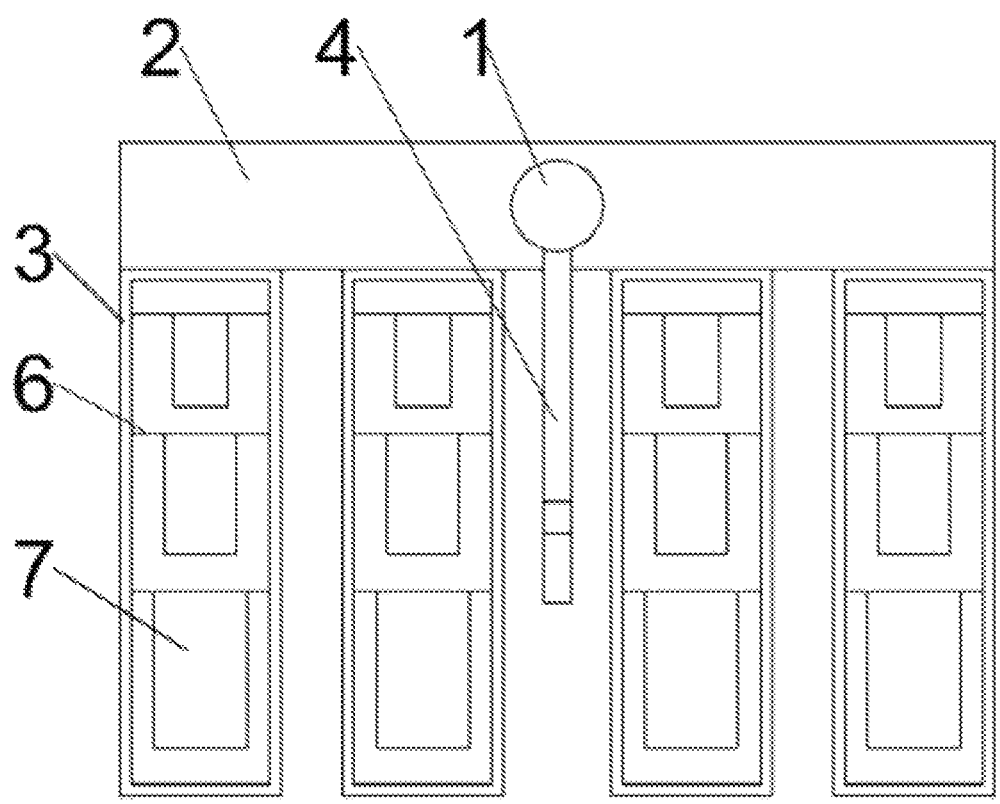
FIG. 2 is a top view of the generation device according to the present disclosure.

As shown in FIGS. 1-2, the present disclosure provides a marine current energy generating device for a deep sea cage, including:

a vortex vibration generating portion, where the vortex vibration generating portion is used for generating vortex vibration on a side facing away from a marine current;

power generating portions, where the several power generating portions are arranged in parallel on a side wall of the vortex vibration generating portion facing away from the marine current, several nano friction generators 7 are arranged in the power generating portions, the several nano friction generators 7 generate power by using the vortex vibration generated by the vortex vibration generating portion, and the several nano friction generators 7 are electrically connected to each other;

a guide portion, where the vortex vibration generating portion is rotatably connected to the cage 5 through the guide portion, and the guide portion is used for making the vortex vibration generating portion perpendicular to a direction of a marine current speed all the time; and corrosion protection assemblies, where the corrosion protection assemblies are arranged at joints of the vortex vibration generating portion to the power generating portions, at a joint of the vortex vibration generating portion to the guide portion, and between the power generating portions and the nano friction generators 7 separately.

The vortex vibration generating portion mainly functions to generate a vortex street at a rear of the vortex vibration generating portion after a marine current passes through, and the generated vortex street can drive the several nano friction generators 7 to rub and vibrate so as to generate electric energy. The power generating portion mainly functions to convert mechanical energy of vortex vibration generated by the vortex street into electric energy, so as to implement efficient power generation, and furthermore, the power generating portion can change the number and arrangement matrix of the nano friction generators 7 connected according to actual use conditions, so as to fully use energy in space. The guide portion mainly functions to make the vortex vibration generating portion perpendicular to the flow direction of the marine current all the time by using push of the marine current when the flow direction of the marine current changes, and finally to make the nano friction generators 7 fully use the mechanical energy of the vortex vibration to generate power. On the whole, the present disclosure solves the problems of low power generation efficiency and low energy utilization of marine current energy, and based on the Karman vortex street principle, the marine current energy can be fully and effectively used to generate power when a flow speed of the marine current is low. The connected number and arrangement mode of the nano friction generators 7 can be changed according to actual conditions, such that the generation efficiency is effectively improved. Moreover, the nano friction generators can work in seawater for a long time through corrosion protection treatment.

As a further optimized solution, the vortex vibration generating portion includes a cross rod 2, the cross rod 2 has a trapezoidal cross section, the power generating portions are fixedly connected to a side wall of the cross rod 2 facing away from the marine current, and the middle of the top surface of the cross rod 2 is fixedly connected to the guide portion.

Since the cross rod 2 has a trapezoidal cross section, a frequency of vortex vibration generated at a rear portion of the cross rod is increased stably compared with a current resistive body having a circular cross section, and vibration is more stabler, such that the nano friction generator 7 can receive stable vortex force, thereby performing stable operation and improving stability of a generated current.

As a further optimized solution, the power generating portion includes several fixing frames 3, the several fixing frames 3 are fixedly connected to a side wall of the cross rod 2 facing away from the marine current, the several fixing frames 3 are parallel to a direction of the marine current, and the fixing frames 3 are flexibly connected to the several nano friction generators 7 through several connecting assemblies respectively.

As a further optimized solution, the connecting assembly includes several nylon ropes 6 fixedly connected in the fixing frames 3 in sequence from front to back along a flow direction of the marine current, the several nylon ropes 6 are arranged in parallel with the cross rod 2 separately, and sides of the nano friction generators 7 are fixedly connected to the nylon ropes 6.

The fixing frames 3 is welded to the cross rod 2, and sides of the nano friction generators 7 are flexibly connected to the fixing frames 3 through the nylon ropes 6, such that the nano friction generators 7 can swing freely under restriction of the nylon ropes 6. After the cross rod 2 generates a vortex street, the several nano friction generators 7 can swing along with a vortex, such that friction between internal structures of the nano friction generators 7 generates a current, and a power generation function is implemented. The plurality of nano friction generators 7 are connected to the fixing frames 3. Since the generated vortices are continuous, the nano friction generators 7 can generate power effectively within a certain distance range, and the generated power can be superimposed when the several nano friction generators 7 work simultaneously, thereby improving power generation efficiency.

According to actual power consumption demands and a size of a marine current of a sea area where the cage 5 is located, the number of the fixing frames 3 mounted on the cross rod 2 can be freely set, or the number of the nano friction generators 7 in each fixing frame 3 can be changed, such that the total number of the nano friction generators 7 on the cross rod 2 can be changed, and generated power is adjustable, so as to adapt to various sea conditions and power generation requirements.

As a further optimized solution, surface areas of the nano friction generators 7 in the fixing frames 3 increase from front to back along a flow direction of the marine current.

Since the farther a distance from the cross rod 2 is, the larger a vortex generated is, areas of the nano friction generators 7 are distributed in longitudinal steps, and the farther the distance from the cross rod 2 is, the larger the area is, so as to improve the power generation efficiency.

As a further optimized solution, the guide portion includes a connecting rod 1 arranged vertically, a bottom of the connecting rod 1 is fixedly connected to the middle of the top surface of the cross rod 2, a top of the connecting rod 1 is rotatably connected to the cage 5, a guide plate 4 is fixedly connected to a side wall of the connecting rod 1, a side surface of the guide plate 4 is parallel to an axis of the connecting rod 1 and perpendicular to an axis of the cross rod 2, and the guide plate 4 is used for driving the cross rod 2 to rotate under push of the marine current, so as to make the cross rod 2 perpendicular to the direction of the marine current speed all the time.

A top of the connecting rod 1 is connected to the cage 5 through a bearing, to achieve free rotation. When the flow direction of the marine current is not perpendicular to an axis of the cross rod 2, a surface of the guide plate 4 is stressed, the marine current pushes the guide plate 4 to rotate the connecting rod 1 until the cross rod 2 is perpendicular to the flow direction of the marine current, and at this time, forces of the guide plate 4 are balanced, and the connecting rod 1 stops turning.

As a further optimized solution, the connecting rod 1, the cross rod 2 and the fixing frames 3 are made of stainless steel respectively.

The connecting rod 1, the cross rod 2 and the fixing frames 3 are made of SUS444 stainless steel. SUS444 is high-alloy ferritic stainless steel with ultra-low carbon nitrogen and high corrosion resistance, and suitable for various water treatment devices, has excellent corrosion resistance and can be used underwater for a long time.

As a further optimized solution, the corrosion protection assembly includes an anticorrosive coating and an corrosion protection coating material, and a joint of the connecting rod 1 and the cross rod 2, joints of the cross rod 2 and the fixing frames 3, joints of the fixing frames 3 and the nylon ropes 6, and a joint of the connecting rod 1 and the guide plate 4 are smeared with the anticorrosive coating and coated with the corrosion protection coating material respectively.

In order to avoid seawater corrosion at the joint of each structure, the joint is coated with a layer of PVC material after being smeared with the anticorrosive coating, so as to further improve the corrosion resistance.

A working process of the embodiment is as follows: the generating device in the present disclosure is rotatably connected to the cage 5 through the connecting rod 1. Under push of the marine current, the guide plate 4 drives the cross rod 2 to rotate through the connecting rod 1 until the guide plate 4 is parallel to a direction of the marine current, forces on two sides of the guide plate 4 are balanced, the guide plate 4 does not deflect, and the cross rod 2 is perpendicular to the direction of the marine current. After the marine current passes through the cross rod 2, a stable Karman vortex street is generated behind the cross rod 2. The vortex of the Karman vortex street continues to move to the rear of the cross rod 2, and at the same time, the vortex makes the several nano friction generators 7 swing around the nylon rope 6, such that friction between internal structures of the nano friction generators 7 generates a current, and power generation is implemented. According to different sea conditions and different power consumption demands, the number of the fixing frames 3 connected to the cross rod 2 or the number of the nano friction generators 7 connected in the fixing frames 3 can be changed to adjust generated power, so as to adapt to various sea conditions and power generation requirements.

Embodiment 2

Figure 3:
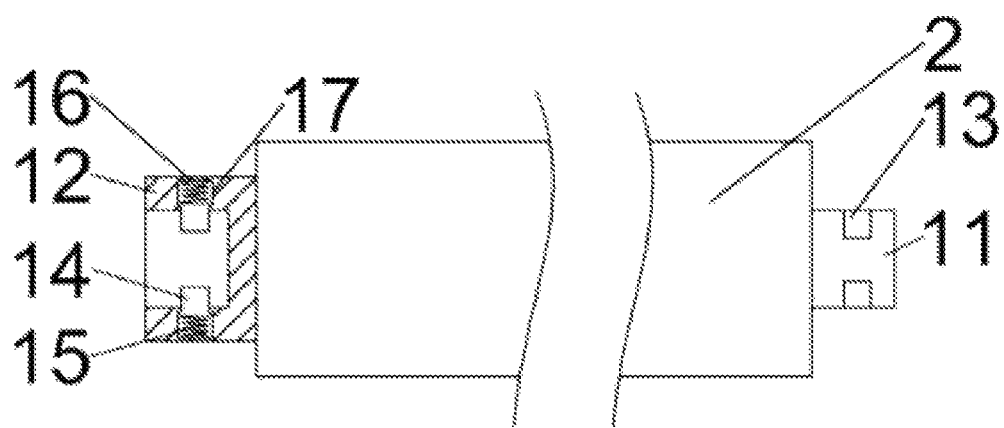
FIG. 3 is a schematic diagram of a cross rod in Embodiment 2 according to the present disclosure.
Figure 4:
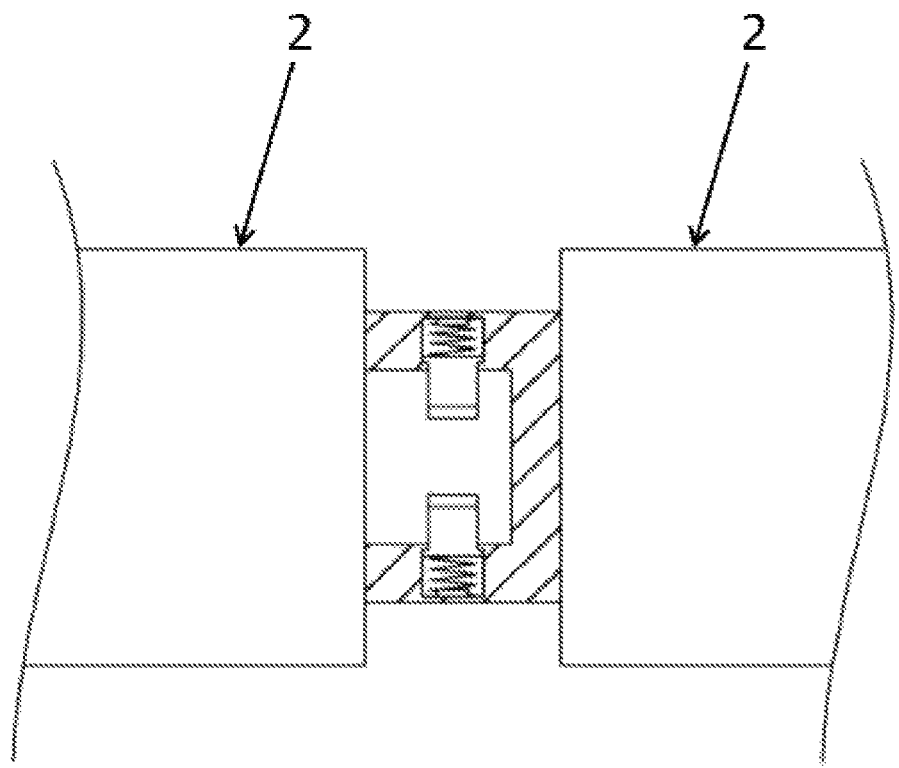
FIG. 4 is a schematic diagram showing a connection between two cross rods in Embodiment 2 according to the present disclosure.

As shown in FIGS. 3-4, a difference between the embodiment and Embodiment 1 is merely that two ends of the cross rod 2 are fixedly connected to a connecting block 11 and a connecting groove 12, and the connecting block 11 of one cross rod 2 is arranged corresponding to a connecting groove 12 of another cross rod 2.

Two opposite side walls of the connecting block 11 are provided with grooves 13 inwards separately. Two opposite inner walls of the connecting groove 12 are provided with slide grooves 17 separately. The two slide grooves 17 are connected to metal stoppers 14 in a sliding way. Springs 15 are abutted between the metal stoppers 14 and bottoms of the slide grooves 17. Electromagnets 16 are fixedly connected to the bottoms of the slide grooves 17. The electromagnets 16 are arranged corresponding to the metal stoppers 14. The grooves 13 are arranged corresponding to the metal stoppers 14.

When larger expansion of power generation capacity is required, the two ends of the cross rod 2 fixedly connected to the connecting rod 1 can be connected to a cross rod 2 separately, to increase the number of the nano friction generators 7 which can be mounted, such that the utilization efficiency of marine current energy is improved, and the power generation capacity is increased. Specifically, by energizing the electromagnet 16, the electromagnet attracts the metal stopper 14 to move into the slide groove 17, retract to the slide groove 17 and compress the spring 15. After a connecting block 11 of a cross rod 2 is inserted into the connecting groove 12, the electromagnet 16 is de-energized. After the metal stopper 14 is not attracted by magnetic force, the metal block extends out of the slide groove 17 and is clamped into the groove 13 under an elastic force of the spring 15, such that connection of the two cross rods 2 is implemented.

Embodiment 3

Figure 5:
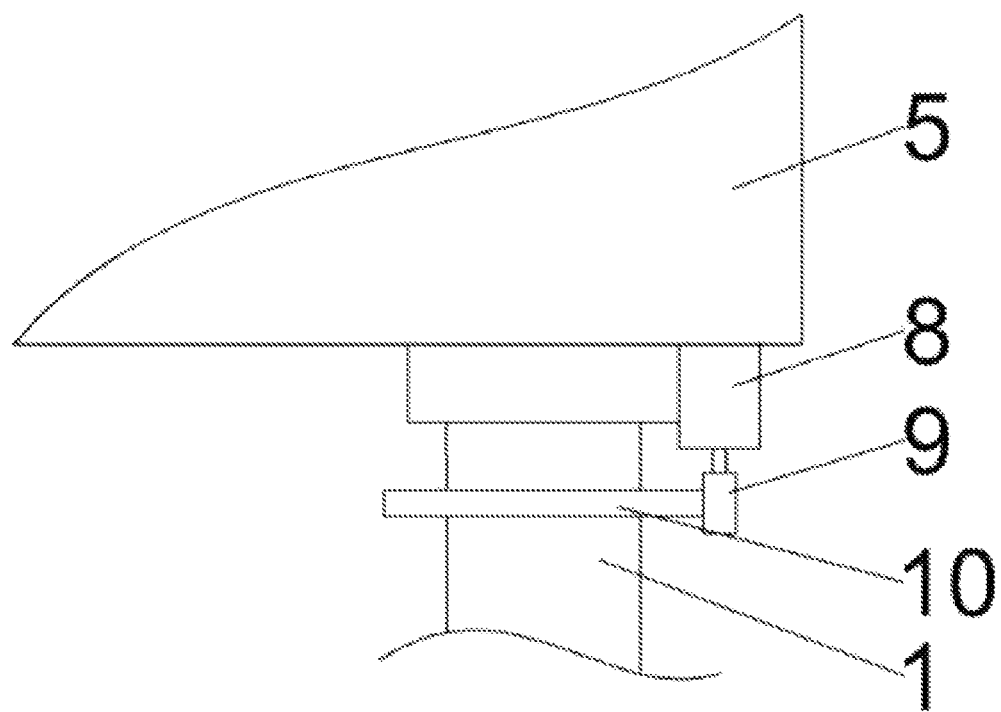
FIG. 5 is a front view of a joint of a connecting rod and a cage in Embodiment 3 according to the present disclosure.

As shown in FIG. 5, a difference between the embodiment and Embodiment 1 is merely that an end of the connecting rod 1 close to the cage 5 is fixedly sleeved with a gear ring 10, a bottom of the cage 5 is fixedly connected to a generator 8, an output shaft of the generator 8 is fixedly sleeved with a gear 9, and the gear 9 meshes with the gear ring 10.

A circuit involved in the generator 8 is waterproof, and corrosion protection treatment is performed between the gear 9 and the gear 10. As for the circuit, when the guide plate 4 is pushed by a marine current to drive the connecting rod 1 to rotate left and right, the gear ring 10 on the connecting rod 1 also rotates synchronously around an axis of the connecting rod 1, and rotation of the gear ring 10 drives the generator 8 to rotate through the gear 9 to generate power, such that mechanical energy of the connecting rod 1 is converted into electric energy. The efficiency of utilizing marine current energy by the generating device according to the present disclosure is further improved.

In the description of the present disclosure, it should be understood that the terms "longitudinal", "transverse", "upper", "lower", "front", "back", "left", "right", "vertical", "horizontal", "top", "bottom", "inner", "outer", etc. indicate azimuthal or positional relations based on those shown in the drawings only for ease of description of the present disclosure, and are not intended to indicate or imply that the referenced device or element must have a particular orientation and be constructed and operative in a particular orientation, and thus may not be construed as a limitation on the present disclosure.

The embodiments above only describe the optional embodiments of the present disclosure and does not limit the range of the present disclosure, such that on the premise of not departing from the design spirit of the present disclosure, various modifications and improvements made to the technical solution of the present disclosure by those ordinary skills in the art should fall within the scope of protection as determined by the claims of the present disclosure.

What is claimed is:

1. A marine current energy generating device for a deep sea cage, comprising:
    a vortex vibration generating portion, wherein the vortex vibration generating portion is used for generating vortex vibration on a side facing away from a marine current;
    a plurality of power generating portions, wherein the plurality of power generating portions are arranged in parallel on a side wall of the vortex vibration generating portion facing away from the marine current, a plurality of nano friction generators (7) are arranged in the plurality of power generating portions, the plurality of nano friction generators (7) are used for generating power by using the vortex vibration generated by the vortex vibration generating portion, and the plurality of nano friction generators (7) are electrically connected to each other;
    a guide portion, wherein the vortex vibration generating portion is rotatably connected to a cage (5) through the guide portion, and the guide portion is used for making the vortex vibration generating portion perpendicular to a direction of a marine current speed all the time; and
    corrosion protection assemblies, wherein the corrosion protection assemblies are arranged at joints of the vortex vibration generating portion to the plurality of power generating portions, at a joint of the vortex vibration generating portion to the guide portion, and between the plurality of power generating portions and the plurality of nano friction generators (7) respectively;
    wherein the vortex vibration generating portion comprises a cross rod (2), the cross rod (2) has a trapezoidal cross section, the plurality of power generating portions are fixedly connected to the side wall of the cross rod (2) facing away from the marine current, and a middle of a top surface of the cross rod (2) is fixedly connected to the guide portion;
    wherein the plurality of power generating portions comprise a plurality of fixing frames (3), the plurality of fixing frames (3) are fixedly connected to the side wall of the cross rod (2) facing away from the marine current, the plurality of fixing frames (3) are parallel to a direction of the marine current, and the plurality of fixing frames (3) are flexibly connected to the plurality of nano friction generators (7) through a plurality of connecting assemblies respectively;
    wherein the plurality of connecting assemblies comprise a plurality of nylon ropes (6) fixedly connected in the plurality of fixing frames (3) in sequence from front to back along a flow direction of the marine current, the plurality of nylon ropes (6) are arranged in parallel with the cross rod (2) separately, and sides of the plurality of nano friction generators (7) are fixedly connected to the plurality of nylon ropes (6); and
    wherein surface areas of the plurality of nano friction generators (7) in the plurality of fixing frames (3) increase from front to back along the flow direction of the marine current.

2. The marine current energy generating device for the deep sea cage according to claim 1, wherein the guide portion comprises a connecting rod (1) arranged vertically, a bottom of the connecting rod (1) is fixedly connected to the middle of the top surface of the cross rod (2), a top of the connecting rod (1) is rotatably connected to the cage (5), a guide plate (4) is fixedly connected to a side wall of the connecting rod (1), a side surface of the guide plate (4) is parallel to an axis of the connecting rod (1) and perpendicular to an axis of the cross rod (2), and the guide plate (4) is used for driving the cross rod (2) to rotate under push of the marine current, so as to make the cross rod (2) perpendicular to the direction of the marine current speed all the time.

3. The marine current energy generating device for the deep sea cage according to claim 2, wherein the connecting rod (1), the cross rod (2) and the plurality of fixing frames (3) are made of stainless steel respectively.

4. The marine current energy generating device for the deep sea cage according to claim 2, wherein each of the corrosion protection assemblies comprises an anticorrosive coating and an corrosion protection coating material, and a joint of the connecting rod (1) and the cross rod (2), joints of the cross rod (2) and the plurality of fixing frames (3), joints of the plurality of fixing frames (3) and the plurality of nylon ropes (6), and a joint of the connecting rod (1) and the guide plate (4) are smeared with the anticorrosive coating and coated with the corrosion protection coating material respectively.

\* \* \* \* \*